United States Patent [19]

Schumacher

[11] Patent Number: 4,511,626

[45] Date of Patent: Apr. 16, 1985

[54] ONE-PART MOISTURE-CURABLE POLYURETHANE ADHESIVE, COATING, AND SEALANT COMPOSITIONS

[75] Inventor: Gerald F. Schumacher, Stillwater, Minn.

[73] Assignee: Minnesota Mining and Manufacturing Company, St. Paul, Minn.

[21] Appl. No.: 416,301

[22] Filed: Sep. 9, 1982

[51] Int. Cl.$^3$ .............................................. C08G 18/76
[52] U.S. Cl. ............................. 428/425.6; 428/425.8; 427/409; 521/115; 528/52
[58] Field of Search ........................ 521/115; 528/52; 428/425.6, 425.8; 427/409

[56] References Cited

U.S. PATENT DOCUMENTS

| | | | |
|---|---|---|---|
| 3,330,782 | 7/1967 | Poppelsdorf | 260/2.5 |
| 3,380,950 | 4/1968 | Blomeyer | 260/31.2 |
| 3,380,967 | 4/1968 | Lowe et al. | 260/77.5 |
| 3,627,722 | 12/1971 | Seiter | 260/37 N |
| 3,707,521 | 12/1972 | De Santis | 260/37 N |
| 3,779,794 | 12/1973 | De Santis | 117/72 |
| 3,925,268 | 12/1975 | Rosemund et al. | 260/2.5 AC |

FOREIGN PATENT DOCUMENTS

WO81/00671  3/1981  PCT Int'l Appl. .

OTHER PUBLICATIONS

Wright, P. et al., *Solid Polyurethane Elastomers* (1969) pp. 30-32.
Mobay Product Information Bulletins for Desmodur E-21, published Dec. 1972.
"Propylene Oxide Polymers and Higher 1,2-Epoxide Polymers", *Kirk-Othmer Encyclopedia of Chemical Technology*, 3rd Edition, 18, 633, 636 (1982).

*Primary Examiner*—Veronica P. Hoke
*Attorney, Agent, or Firm*—D. M. Sell; J. A. Smith; D. R. Cleveland

[57] ABSTRACT

Adhesive, coating, or sealant compositions containing prepolymer(s) derived from MDI (or derivative(s) thereof) and polyol(s) containing primary hydroxyl groups, together with bis[2-N,N-dialkylamino)alkyl]ether(s).

20 Claims, No Drawings

ONE-PART MOISTURE-CURABLE POLYURETHANE ADHESIVE, COATING, AND SEALANT COMPOSITIONS

TECHNICAL FIELD

This invention relates to one-part moisture-curable adhesive, coating, and sealant compositions. In addition, this invention relates to adhesives and sealants for use in bonding articles to substrates. Also, this invention relates to a method for bonding articles to substrates, and to cured assemblies thereof.

BACKGROUND ART

One-part moisture-curable polyurethane compositions have been used as adhesives, coatings, and sealants (see, e.g., U.S. Pat. Nos. 3,380,950, 3,380,967, 3,707,521, 3,779,794) and provide convenient application and good ultimate physical properties. For example, most U.S. automobile manufacturers utilize one-part moisture-curable polyurethane sealants to bond front and rear windshield glass to automotive passenger car bodies. The resultant bonded windshield assemblies become an integral structural part of the car body and contribute to the roof crush resistance thereof, thereby assisting the car manufacturer in meeting the requirements of DOT specification No. 216 (see 49 CFR 571.216).

For any adhesive, coating, or sealant composition, the ultimate physical properties available after cure (e.g., tensile strength, shear strength, weathering resistance, flexibility, etc.) are of great importance to the user. However, ultimate physical properties are not the only parameters by which such compositions can be evaluated. Most adhesive, coating, and sealant compositions provide a gradual buildup of physical properties during cure. It is highly desirable for such compositions to provide not only a high level of ultimate physical properties but also rapid attainment thereof. For example, a windshield sealant for use on cars manufactured by General Motors Corp. not only must pass certain physical property tests specified by the automaker but must pass such tests within 6 hours after sealant application. Similarly, adhesives, coatings, and sealants used in structural applications (e.g., building construction, general manufacturing, and the like) not only must provide good physical properties (e.g., high bond strength) but also should provide such properties as rapidly as possible in order to speed assembly times and reduce fixturing costs. In general, for an adhesive, coating, or sealant composition with a given level of physical properties, the faster the rate of property buildup, the better.

An additional important parameter by which such compositions are evaluated is the "tack-free time" thereof, that is, the time required for a sample of the composition to become non-tacky to the touch after exposure of the composition to ambient air. Compositions having rapid tack-free time enable parts bonded therewith to be subjected to subsequent operations (e.g., grinding, drilling, handling, packaging, and the like) which could contaminate parts joined with a tacky material. In general, for an adhesive, coating, or sealant having a given level of physical properties, the faster the tack-free time, the better.

A further important parameter by which such compositions are evaluated is the shelf life thereof, that is, the amount of time the compositions can be stored under typical storage conditions without significant loss of handling properties when uncured, physical properties when cured, or cure characteristics during cure. Unfortunately, compositions having rapid physical property buildup or rapid tack-free times typically also have attenuated shelf life, thus making it very difficult to obtain rapid physical property buildup, rapid tack-free time, and long shelf life in a single composition.

DISCLOSURE OF INVENTION

The present invention provides, in one aspect, compositions having excellent ultimate physical properties combined with rapid physical property buildup, rapid tack-free times, and long shelf life, suitable for use as adhesives, coatings, or sealants, said compositions comprising:

(a) prepolymer(s) derived from 4,4'-diphenylmethane diisocyanate (or isocyanate-functional derivative(s) of 4,4'-diphenylmethane diisocyanate) and polyol(s) containing primary hydroxyl groups, and (b) bis[2-(N,N-dialkylamino)alkyl]ether(s).

The present invention also provides adhesive, coating, or sealant formulations for glass, comprising the above-described compositions and silane-containing primers, such primers being applied to the glass as a separate layer to which the formulations are subsequently applied, or being incorporated into the formulations as a component thereof, or both.

Also, the present invention provides cured assemblies comprising an article, a substrate, and a layer of the above-described compositions or formulations therebetween.

In addition, the present invention provides a method for bonding articles to substrates, comprising the step of applying therebetween a layer of the above-described compositions of formulations.

DETAILED DESCRIPTION

The prepolymer (a) is derived from certain precursors, such precursors being 4,4'-diphenylmethane diisocyanate or isocyanate-functional derivative(s) thereof and one or more polyols containing primary hydroxyl groups (sometimes referred to hereafter as "primary polyols"). As used herein, a prepolymer "derived from" the above-named precursors will include prepolymers actually prepared by reacting together such precursors, and will also be construed to include prepolymers which have not actually been prepared by reacting together such precursors but which have chemical structures capable of being prepared from such precursors if desired.

A preferred class of prepolymers for use in this invention have the formula:

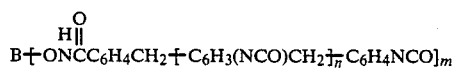

where m is 2 or more, n is greater than or equal to zero, and B is a polyvalent backbone. Preferably, m is about 2 to 4. Also, n preferably is zero or about 1 and most preferably is zero. B preferably is a polyvalent aliphatic, olefinic, ether, ester, thioether, urethane, or urea radical. Most preferably, B is a polyvalent polyether radical.

A preferred subclass of prepolymers of Formula I, above, have the formula:

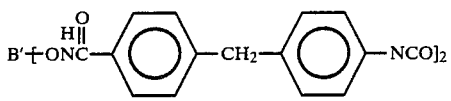

where B' is a divalent polyether radical.

The preferred method for preparing prepolymers for use in this invention involves the reaction of 4,4'-diphenylmethane diisocyanate or isocyanate-functional derivative(s) thereof and one or more primary polyols. Other methods can be used if desired, but generally are less convenient or more expensive than the preferred method.

4,4'-Diphenylmethane diisocyanate is commonly known as "methylene diisocyanate" or "MDI". In its pure form, MDI is commercially available as "Isonate 125M" from the Upjohn Co., and as "Mondur M" or "Multrathane M" from Mobay Chemical Corp. As used herein, "isocyanate-functional derivatives of MDI" will be construed to include isocyanates actually prepared from MDI, and will also include isocyanates which have not actually been prepared from MDI but which have chemical structures capable of being prepared from MDI if desired. Isocyanate-functional derivatives of MDI which can be used in this invention include liquid mixtures of MDI and melting point modifiers (e.g., mixtures of MDI with polycarbodiimide adducts such as "Isonate 143L", commercially available from the Upjohn Co., and "Mondur CD", commercially available from Mobay Chemical Corp.), polymeric diphenylmethane diisocyanates (e.g., "PAPI", and the series "PAPI 20" through "PAPI 901", commercially available from the Upjohn Co., "Mondur MR", "Mondur MRS", and "Mondur MRS-10", commercially available from Mobay Chemical Corp., and "Rubinate M", commercially available from Rubicon Chemicals, Inc.), and blocked isocyanate compounds formed by reacting MDI or the above-described isocyanate-functional derivatives of MDI with blocking agents such as ketoximes, phenols, and the like. Such blocked isocyanate compounds will, for convenience, be regarded herein as isocyanate-functional derivatives of MDI. Also, MDI and its isocyanate-functional derivatives will sometimes be referred to collectively herein as "MDI".

As used herein, a "primary hydroxyl group" is a monovalent radical having a hydroxyl radical bonded to a methylene (i.e., carbene) radical. Similarly, "secondary hydroxyl group" will be used herein to refer to a monovalent radical having a hydroxyl radical bonded to a methylidyne (i.e., methyne) radical. As used herein, a "primary polyol" is a polyol containing two or more primary hydroxyl groups. Similarly, "secondary polyol" will be used herein to refer to polyols containing two or more secondary hydroxyl groups. Polyols containing both primary hydroxyl groups and secondary hydroxyl groups will be regarded herein as primary polyols if the primary hydroxyl groups thereof are reactive with MDI.

Suitable primary polyols have a backbone containing, for example, aliphatic, olefinic, ether, ester, thioether, urethane, or urea linkages. Primary polyols containing ether linkages (e.g., those having a polyether backbone) are preferred. The primary polyols are monomers, oligomers, or polymers, but preferably are oligomers or polymers. Preferably, the primary polyols have a number average molecular weight between about 90 and 8000, most preferably between about 200 and 3000. The primary polyols preferably have 2 to 4 primary hydroxyl groups per molecule. Expressed in terms of hydroxyl equivalent weights, the primary polyols preferably have a hydroxyl equivalent weight between about 45 and 2500, most preferably between about 100 and 1500. "Hydroxyl number", as used herein, refers to the number of milligrams of KOH having the same hydroxyl content as one gram of the polyol. "Hydroxyl equivalent weight" or "OH equivalent weight", as used herein, refers to the quotient obtained by dividing 56,100 by the hydroxyl number. "Hydroxyl equivalent", as used herein, refers to the quotient obtained by dividing the number average molecular weight of the polyol by the number of hydroxyl groups therein. "NCO equivalent", as used herein, refers to the quotient obtained by dividing the number average molecular weight of an isocyanate by the number of reactive isocyanate groups therein.

Suitable primary polyols for use in this invention include polytetramethylene oxide glycols, ethylene oxide-terminated polypropylene glycols, polyethylene glycols, hydroxyl-terminated polybutadienes, aliphatic glycols, polyester polyols (e.g., polyacrylate polyols or polycaprolactone polyols), fatty alcohols, and triglycerides (e.g., castor oil). Mixtures of primary polyols can be used if desired.

Suitable commercially available primary polyols include "Pluracol TPE 4542" ethylene oxide-terminated polypropylene glycol, commercially available from BASF/Wyandotte Corp., "Voranol E" series polyethylene glycols, commercially available from Dow Chemical Co., "QO Polymeg" 650, 1000, or 2000 series polytetramethylene oxide glycols, commercially available from Quaker Oats Co., "Teracol 2000" polytetramethylene oxide glycol, commercially available from E. I. duPont de Nemours & Co., Inc., "Niax" series "PCP", and "Capped Polyols", as well as "Polymer Polyols" and "Mixed Oxide Polyols" containing primary hydroxyl groups, commercially available from Union Carbide Corp., "Poly-G" 53-, 55-, 56-, 85-, and 86- series ethylene oxide-terminated polypropylene glycols, commercially available from Olin Chemicals, "Poly bd" hydroxyl-terminated polybutadienes, commercially available from ARCO/Chemical Co., and "Multron" and "Multrathane" polyester polyols, commercially available from Mobay Chemical Co.

A preferred subclass of primary polyols for use in this invention are polytetramethylene oxide glycols, particularly those having a number average molecular weight from about 650 to 2000, preferably from about 1000 to 2000. Another preferred subclass of primary polyols for use in this invention are ethylene oxide-terminated polypropylene glycols, particularly those having a number average molecular weight from about 500 to 3000, preferably from about 1000 to 2000. A third preferred subclass of primary polyols for use in this invention are polycaprolactone polyols, particularly those having a number average molecular weight from about 300 to 3000, preferably about 800 to 2000.

For optimum shelf life in the compositions of this invention, it is preferred that the primary polyol(s) have a pH between about 5.5 and 7. Most preferably, the pH of the primary polyols is between about 6 and 6.5.

It has been reported that isocyanates are more reactive with primary polyols than with secondary polyols (see, e.g., U.S. Pat. No. 3,925,268 and "Propylene Oxide Polymers and Higher 1,2-Epoxide Polymers", *Kirk-Othmer Encyclopedia of Chemical Technology*, 3d Edition, 18, 633, 636 (1982), and this property has been used in the making of two-part polyurethanes (e.g., urethane foams). Curing of the one-part compositions of the present invention occurs when the isocyanate functionality of the prepolymer reacts with water (e.g., atmospheric moisture). In that sense, curing of the compositions of the present invention does not involve reaction of an isocyanate with a polyol. The prepolymers used in this invention have been found to be more reactive with water than corresponding prepolymers derived from secondary polyols.

An additional advantage of compositions of this invention is that their tack-free times are not greatly affected by addition of filler to the compositions. In general, the tack-free times of filled compositions of the invention containing prepolymers derived entirely from MDI and primary polyols are no more than about twice as long (at a 30 weight percent filler addition) as the tack-free times of corresponding unfilled compositions. Preferably, the tack-free times of filled compositions of the invention are no more than about 15 minutes (at about a 30 weight percent filler addition) at 25° C. and 50 percent relative humidity. The tack-free time of compositions of the invention can be adjusted as desired for the convenience of users.

If desired, the prepolymers used in this invention can be derived from reaction mixtures containing MDI and primary polyols together with additional reactants such as aromatic isocyanates (e.g., 2,4-toluene diisocyanate, hereafter referred to as "TDI"), secondary polyols, or other additional reactants which do not materially detract from the functioning of the prepolymer in the compositions of this invention. For example, it is frequently desirable to employ secondary polyols in the reaction mixture from which the prepolymers are prepared, in order to adjust the handling properties, physical properties, or cure characteristics of the compositions of the invention. Preferably, the polyols in the prepolymer reaction mixture are about 25 to 100 weight percent primary polyols and 75 to 0 weight percent secondary polyols, and most preferably about 40 to 80 weight percent primary polyols and 60 to 20 weight percent secondary polyols. Suitable secondary polyols include polyproplyene ether diols and higher polyalkylene ether diols (e.g., polybutylene ether diols), polyalkylene ether triols (e.g., those prepared by condensing a lower alkylene oxide such as ethylene oxide or propylene oxide with an alkylene triol such as glycerine, trimethylolpropane, or the like), and polyols with tetra- or higher functionality such as pentaerythritol, sorbitol, and the like.

Preferred secondary polyols include propylene oxide-terminated ethylene oxide glycols and polypropylene glycols. Suitable commercially available secondary polyols which can be incorporated into prepolymers for use in this invention include "Niax" series "PPG", "LG", "LHT", and "Special Purpose Polyols", as well as "Polymer Polyols" and "Mixed Oxide Polyols" containing secondary hydroxyl groups, commercially available from Union Carbide Corp., "Pluracol" series polyols containing secondary hydroxyl groups, commercially available from BASF/Wyandotte Corp., "Voranol P" series polypropylene glycols, commercially aailable from Dow Chemical Co., and "Poly-G" 20- and 30- series polypropylene glycols, commercially available from Olin Chemicals.

MDI, the primary polyol(s), and the secondary polyol(s) (if used) are reacted with one another under conventional polyurethane reaction conditions known to those skilled in the art. Preferably the NCO:OH ratio (counting both primary and secondary hydroxyl groups) of the reactants is about 1.2:1 to 3.5:1, and most preferably is about 1.8:1 to 2.2:1. As the NCO:OH ratio is increased, the compositions of the invention tend to be less moisture sensitive and to have longer shelf life. Ordinarily, the prepolymer is prepared under a suitable atmosphere (e.g., nitrogen). Reactants which are in solid form are dissolved in a suitable solvent or melted prior to addition of the other reactants. It is convenient to add MDI to the reaction vessel first, followed by heating or addition of solvent if necessary to liquify the MDI, followed by addition of secondary polyols (if used), followed by addition of primary polyols. The reaction mixture is maintained at about 50° C. to 70° C. until the desired isocyanate equivalent weight is obtained. The prepolymer can be separately stored for later use or the remaining ingredients of the compositions of the invention can be added to the reaction vessel.

As one example of an alternate method for preparation of prepolymers (e.g., prepolymers with a polyether backbone) used in this invention, one mole of a polytetramethylene oxide diol having the formula III, below, and containing about 2 moles of reactive hydroxyl groups is reacted with excess (i.e., more than 2 moles) phosgene in the presence of a low boiling alkylamine, (e.g., $(CH_3)_3N$) at about 0° C. in a closed reaction vessel to provide a di(carbamoyl chloride)-terminated polyether having the formula IV, below. The compound of formula IV is reacted with about 2.2 moles di(paraminophenyl)methane in the presence of about 2.2 moles low boiling alkylamine to provide a di(amine)-terminated polyether polyurethane having the formula V, below. The compound of formula V is reacted with excess phosgene in the presence of low boiling alkylamine at about 0° C. in a closed container to provide the desired prepolymer, VI, below:

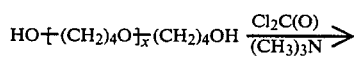

III (x is 1 or more)

IV

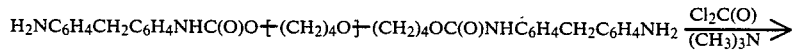

V

-continued

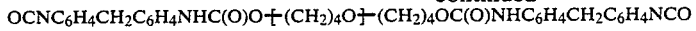
VI

Regardless of the method of preparation of the prepolymer, the free isocyanate groups of the prepolymer can, if desired, be blocked to decrease moisture sensitivity, e.g., by reacting the prepolymer with a labile reagent that can be displaced during the subsequent curing of the prepolymer. Suitable blocking agents preferably do not require heat for deblocking, and include di(lower alkyl)malonates, ethyl acetoactate, isophorone, acetone, methyl ethyl ketone, and the like. Ordinarily, an excess of blocking agent is employed to assure that all free isocyanates groups of the prepolymer react with the blocking agent. It is been found that the compositions of the present invention are sufficiently stable that the use of a blocking agent is not ordinarily required. Elimination of the blocking agent can reduce cost and reduce the evolution of volatile substances during cure. Preferably, no blocking agents are employed in the composition of this invention.

The compositions of this invention are prepared by combining the prepolymer with an effective amount of bis[2-(N,N-dialkylamino)alkyl]ether(s) (hereafter sometimes referred to as "bis ethers" or "bis ether"). Suitable bis ethers are described, for example, in U.S. Pat. No. 3,330,782, and include, for example, bis[2-(N,N-dimethylamino)ethyl]ether, bis[2-(N,N-dimethylamino)-1-methylethyl]ether, and 2-(N,N-dimethylamino)thyl-2-(N,N-dimethylamino)-1-methylethylether. A preferred bis ether is bis[2-(N,N-dimethylamino)ethyl]ether, which is commercially available from Union Carbide Corp. as "Niax A-99". As used herein, an "effective amount" of an ingredient is an amount sufficient to provide desired physical properties (e.g., cure rate or tensile strength) in the compositions of the invention. An effective amount of bis ether preferably is about 0.002 to 2 weight percent, and most preferably about 0.05 to 0.5 weight percent based upon the weight of prepolymer.

The prepolymer and bis ether are mixed using conventional mixing techniques. It is preferred to mix the prepolymer and bis ether under anhydrous conditions. Generally, the bis ether is dissolved in a suitable solvent (e.g., toluene) and added to the prepolymer. The resulting mixture should be stored in a sealed container until the time of use.

The mixture of prepolymer and bis ether can contain other ingredients or adjuvants if desired. For example, it is preferred to include an effective amount of organic tin catalyst in the compositions of the invention. Suitable organic tin catalysts are described in U.S. Pat. No. 3,330,782, Cols. 5 and 6. Dibutyl tin dilaurate is a preferred organic tin catalyst. An effective amount of organic tin catalyst preferably is about 0.001 to 1 percent, based upon the weight of prepolymer. It is also preferred to include an effective amount of other adjuvants such as extender and/or reinforcing fillers (e.g., carbon black, metal oxides such as zinc oxide, and minerals such as talc, clays, silica, silicates, and the like) in the compositions of the invention. Carbon black is a particularly preferred filler for use where resistance to degradation caused by ultraviolet light exposure is desired, e.g., for use in windshield sealants. An effective amount of filler preferably is between about 0 and 80 weight percent based upon the weight of prepolymer, and most preferably between about 20 and 60 weight percent. Solvents such as toluene, xylene, methyl ethyl ketone, acetone, ethyl acetate, "Cellosolve Acetate" (commercially available from Union Carbide Corp.), and other suitable materials free of isocyanate-reactive moieties can be employed in compositions of the invention. Toluene is a preferred solvent. An effective amount of solvent preferably is between about 0 and 80 weight percent based upon the weight of prepolymer. Plasticizers such as partially hydrogenated terphenyls (e.g., "HB-40", commercially available from Monsanto Corp.), dioctyl phthalate, dibutyl phthalate, diisodecyl phthalate, or tricresyl phosphate can also be employed in compositions of the invention. Partially hydrogenated terphenyls are a preferred plasticizer. An effective amount of plasticizer preferably is between about 0 and 25 weight percent based upon the weight of prepolymer. In addition, the compositions of the invention can contain antioxidants, pigments, UV absorbers, adhesion promoters, drying agents (e.g., molecular sieves such as sodium aluminum silicate or dessicants such as zeolite, silica gel, barium oxide, or calcium oxide), and the like. For use in glass sealant compositions, it is desirable to employ an effective amount of a silane-containing primer, either as an ingredient of the sealant composition, or as a separate layer placed between the surface of the glass to be sealed and the layer of sealant, or as both an ingredient of the sealant composition and as a separate layer. Suitable silane-containing primers are described in U.S. Pat. Nos. 3,627,722 and 3,707,521. If silane-containing primer is incorporated into a sealant composition of this invention, an effective amount of silane-containing primer preferably is between about 2.5 and 10 weight percent, based upon the weight of prepolymer. If silane-containing primer is employed as a separate primer coating, then an effective amount of such silane-containing primer in the primer coating will be an amount which gives the desired degree of bonding performance given the mode of application of the primer layer and the sealant composition to the surfaces which are to be bonded.

The compositions of the invention can be put up in packages in accordance with techniques known to those skilled in the art. Suitable packages include, for example, caulking tubes (made, for example, of paper, metal, or plastic), screw-capped squeezable tubes, cans, drums, and the like.

The compositions of the invention are cured by exposure to water, e.g., water vapor or moisture. Ordinary ambient humidity is usually adequate to promote cure. Heat or high humidity will accelerate cure, and low temperatures (e.g. 5° C. or less) or low humidity (e.g., 15% R.H. or less) will retard cure. Bonds to damp substrates (e.g., wood) typically cure faster than bonds to dry substrates (e.g., glass).

The compositions of the invention can be employed in any application where a high-performance, rapidly-curing adhesive, coating, or sealant is desired. One such use includes the bonding of glass (e.g., windshields and backlights) to vehicles, either at the time of original manufacture or at the time of glass replacement, in vehicles such as automobiles, trucks, aircraft, trains, and the like. When so used, the compositions of the invention provide rapid drive-away times following glass installation. Other uses include building construction (e.g., as a structural adhesive, panel adhesive, moisture barrier, or glazing sealant), assembly line manufacturing (e.g., for assembly of parts by adhesive bonding), and coatings (e.g., deck coatings or roof membranes). The compositions of the invention can be applied to a variety of articles and substrates, such as articles or substrates of glass, metal, plastic, wood, leather, masonry, textiles, and the like.

The following examples are offered to aid understanding of the present invention and are not to be construed as limiting the scope thereof.

EXAMPLE 1

In a four liter, four inlet flask equipped with mechanical stirrer, thermometer, reflux condenser, and nitrogen supply were combined 312 g (2.5 NCO equivalents) 4,4'-diphenylmethane diisocyanate and about 400 g (0.2 OH equivalents) "LHT 28" (a 6000 M.W. triol containing secondary hydroxyl groups, commercially available from Union Carbide Corp.). The resulting mixture was heated to 60° C. to melt the MDI. Next, 1000 g (1.0 OH equivalents) "Teracol 2000" (a 2000 M.W. diol having primary hydroxyl groups, commercially available from E. I. duPont de Nemours, & Co. Inc.) was heated to 60° C. and added to the flask, followed by addition of 250 g toluene. After addition of all ingredients, the reaction mixture was maintained at 60° C. for four hours with stirring under nitrogen. The resulting prepolymer was cooled to 40° C. and stored in a sealed container.

Separately, 2.25 g "Niax A-99" bis ether was dissolved in a mixture of 100 g "HB-40" plasticizer (partially hydrogenated terphenyl, commercially available from Monsanto Corp.) and 50 g toluene to form a catalyst mixture. A 41 g portion of the catalyst mixture was added to 200 g of the above-described prepolymer with stirring under nitrogen to form a one-part moisture-curable composition.

A 0.74 mm thick spread of the resulting composition was applied to a polytetrafluoroethylene-coated aluminum panel, and observed (by touch) to be tack-free within two minutes at 25° C. and 50% R.H. The spread cured completely within less than one hour.

This example illustrates the very rapid rate of cure and high rate of physical property attainment provided by compositions of the present invention.

EXAMPLE 2

Example 1 was repeated but the amount of bis ether in the catalyst mixture was decreased from 2.25 g to 2.0 g, and 0.25 g dibutyltin dilaurate was added to the catalyst mixture. The tack-free time and time to completely cure a 0.74 mm thick spread of the resulting composition were essentially the same as in Example 1.

This example shows that the bis ether can be used in combination with organic tin catalyst.

COMPARATIVE EXAMPLES 1-4

Using the method of Example 1, four one-part moisture-capable compositions were prepared and evaluated. In Comparative Examples 1, 3, and 4, 1000 g (1.0 OH equivalents) "PPG 2025" (a 2000 M.W. diol having secondary hydroxyl groups, commercially available from Union Carbide Corp.) was used in place of "Teracol 2000" polyol. In Comparative Examples 2 and 3, no bis ether was used in the catalyst mixture and the amount of dibutyltin dilaurate in the catalyst mixture was increased from 0.25 g to 2.25 g. In Comparative Example 4, the catalyst mixture of Example 2 was used in place of the catalyst mixture of Example 1. Set out below in Table 1 are the tack-free time and the time required to completely cure a 1.23 mm thick spread for each of Comparative Examples 1–4.

TABLE 1

|  | Comparative Example | | | |
|---|---|---|---|---|
|  | 1 | 2 | 3 | 4 |
| Tack-free time, min. | 10 | 15 | 45 | 12 |
| 1.23 Mm spread cure time, hrs. | 1 | 1.5 | 2.5 | 1.25 |

These comparative examples show that substitution of a secondary polyol for a primary polyol greatly increased the tack-free time (see Comparative Examples 1, 3, and 4) and, in some cases, increased the time required to cure a 1.23 mm thick spread (see Comparative Examples 3 and 4). Also, elimination of bis ether from the catalyst mixture greatly increased tack-free time and time required to cure a 1.23 mm thick spread (see Comparative Examples 2 and 3).

EXAMPLES 3-13

Using the method of Example 1, several one-part moisture-curable compositions were prepared and evaluated. Set out below in Table 2 are the ingredients, tack-free time, and time required to cure a 1.23 mm thick spread for each example.

TABLE 2

|  | Examples | | | | | | | | | | |
|---|---|---|---|---|---|---|---|---|---|---|---|
|  | 3 | 4 | 5 | 6 | 7 | 8 | 9 | 10 | 11 | 12 | 13 |
| Polyol, OH equivalents | | | | | | | | | | | |
| Primary Polyol A[1] | 0.75 | 0.50 | 0.25 | | | | | | | | |
| Primary Polyol B[2] | | | | 1.0 | 0.75 | 0.50 | 0.25 | | | | |
| Primary Polyol C[3] | | | | | | | | 1.0 | 0.75 | 0.50 | 0.25 |
| Secondary Polyol A[4] | 0.25 | 0.50 | 0.75 | | 0.25 | 0.50 | 0.75 | | 0.25 | 0.50 | 0.75 |
| Secondary Polyol B[5] | ← | ← | ← | ← | ← | 0.2 | → | → | → | → | → |
| MDI, NCO equivalents | ← | ← | ← | ← | ← | 2.5 | → | → | → | → | → |
| Toluene, wt. % | ← | ← | ← | ← | ← | 10 w/o | → | → | → | → | → |
| Tack-free time, min. | 3 | 3 | 6 | 3 | 4 | 5 | 5 | 4 | 7 | 11 | 11 |
| 1.23 Mm thick spread cure time, hrs. | 1 | 1 | 1 | 1 | 1 | 1 | 1 | 1.25 | 1.25 | 1.25 | 1.25 |

[1] "Teracol 2000"
[2] "PCP 0240" (a 2000 M.W. diol having primary hydroxyl groups, commercially available from Union Carbide Corp.).
[3] "Poly G 55-56" (a 2000 M.W. diol having primary hydroxyl groups, commercially available from Olin Chemicals.)
[4] "PPG 2025" (a 2000 M.W. diol having secondary hydroxyl groups, commercially available from Union Carbide Corp.).
[5] "LHT 28" (a 6000 M.W. triol having secondary hydroxyl groups, commercially available from Union Carbide Corp.).

These examples show the use of additional primary polyols (see Examples 6-13). Also, as the amount of primary polyol is decreased and replaced with secondary polyol, the tack-free time of the resulting compositions was increased (compare Examples 3-5 with Example 1, Examples 7-9 with Example 6, and Examples 11-13 with Example 10).

spread of sealant for each example and comparative example.

TABLE 3

|  | Example Nos. | | | | | Comparative Example 5 |
|---|---|---|---|---|---|---|
|  | 14 | 15 | 16 | 17 | 18 | |
| Prepolymer composition, NCO or OH equivalents | | | | | | |
| 1,4-butane diol | 0.25 | 0.25 | 0.25 | | | |
| Primary Polyol D[1] | 1.0 | | | | | |
| Primary Polyol E[2] | | 1.0 | | | | |
| Primary Polyol F[3] | | | 1.0 | 1.0 | 0.5 | |
| Trimethylolpropane | 0.25 | 0.25 | 0.25 | | | |
| Secondary polyol C[4] | | | | | 0.5 | 1.0 |
| Secondary polyol B | | | | 0.2 | 0.2 | 0.2 |
| MDI | 3.15 | 3.15 | 3.15 | 2.52 | 2.52 | 2.52 |
| Toluene, wt. % | ← | ← | 10 w/o | → | → | → |
| Tack-free time, min.[5] | 2 | 2 | 2 | 2 | 4 | 12 |
| Sealant composition, grams | | | | | | |
| Above prepolymer | ← | ← | ← | 750 | → | → |
| Fumed silica[6] | ← | ← | ← | 50 | → | → |
| Zinc oxide | ← | ← | ← | 25 | → | → |
| Talc | ← | ← | ← | 250 | → | → |
| Carbon black[7] | | | | 40 | 40 | 40 |
| TiO$_2$ | 50 | 50 | 50 | | | |
| Plasticizer[8] | ← | ← | ← | 100 | → | → |
| Toluene | ← | ← | ← | 50 | → | → |
| Dibutyltin dilaurate | ← | ← | ← | 0.25 | → | → |
| bis ether[9] | ← | ← | ← | 2 | → | → |
| Coal tar | | | | 30 | | |
| Silane-containing primer[10] | 35 | 35 | 35 | 35 | | |
| Sealant tack-free time, min. | 2 | 2 | 2 | 7 | 10 | 45 |
| Sealant time to cure 0.74 mm thick spread, hrs. | 1.5 to 2 | 1.5 to 2 | 1.5 to 2 | 2.5 | 2.5 | 2.5 |

[1]"Polymeg 650" (a 650 M.W. diol having primary hydroxyl groups, commercially available from Quaker Oats Co.).
[2]"Polymeg 1000" (a 1000 M.W. diol having primary hydroxyl groups, commercially available from Quaker Oats Co.).
[3]"Polymeg 2000" (a 2000 M.W. diol having primary hydroxyl groups, commercially available from Quaker Oats Co.).
[4]"PPG 3025" (a 3000 M.W. diol having secondary hydroxyl groups, commercially available from Union Carbide Corp.).
[5]Tack-free time determined by combining prepolymer with 0.26 wt. % "Niax A-99" bis ether.
[6]"Cab-O-Sil M5" (a fumed silica, commercially available from Cabot Corp.).
[7]"Raven 410" (a furnace carbon black, commercially available from Cities Service Co.).
[8]"HB-40"
[9]"Niax A-99"
[10]Silane-containing primer, prepared by mixing 1610 g biuret of hexamethylene diisocyanate ("Desmodur N-75", commercially available from Mobay Chemical Co.), 427 g of γ-mercaptopropyltrimethoxy silane ("Silane A189", commercially available from Union Carbide Corp.), and 1.3 g dimethylpiperazine in a three liter four inlet resin flask equipped with mechanical stirrer, thermometer, stirrer, reflux condenser, and nitrogen supply, for two hours at 80° C. with stirring.

EXAMPLES 14-18 AND COMPARATIVE EXAMPLE 5

Using the method of Example 1, several one-part moisture-curable sealants were prepared and evaluated. These sealants contained fillers, a UV screening agent, and a silane-containing primer. The sealants were prepared by first forming a prepolymer from polyol(s) and MDI in a 90:10 weight basis mixture of prepolymer precursors and toluene. The tack-free time of the resulting prepolymers was evaluated by combining a sample of prepolymer with a catalyst mixture containing 0.26 weight percent "Niax A-99" bis ether (2 parts of the bis ether were dissolved in a mixture of 100 parts "HB-40" plasticizer, 50 parts toluene, and 0.25 parts dibutyltin dilaurate). Next, filled sealants were prepared by stirring the prepolymer with fillers, plasticizer, solvent, UV screen, and silane-containing primer. Set out below in Table 3 are the compositions of the prepolymers (in equivalents, except for the amount of toluene, which is listed in weight percent), the tack-free time of the prepolymers when added to 0.26 weight percent bis ether (dissolved in the above-described catalyst mixture, the composition of sealants prepared from the prepolymers, and the tack-free time and time to cure a 0.74 mm thick These examples show that incorporation of fillers in the compositions of this invention did not increase the tack-free time (see Example Nos. 14, 15 and 16) or did not greatly increase the tack-free time (see Example Nos. 17 and 18). In contrast, the composition of Comparative Example 5 exhibited nearly a four-fold increase in tack-free time after addition of filler.

The composition of Example 14 was separately evaluated as a structural adhesive. The composition exhibited a tensile strength and elongation (measured in accordance with ASTM D-412) of 123 kg/cm$^2$ and 50%. The composition exhibited overlap shear strengths (measured in accordance with ASTM D-1002, but using glass fiber-reinforced plastic or oak instead of metal) of 84.4 kg/cm$^2$ at 24 hours (with substrate failure) using glass fiber-reinforced plastic, and 56.2 kg/cm$^2$ at 1 hour and 84.4 kg/cm$^2$ at 24 hours (with cohesive failure) using oak. With heating for 1.5 hours at 135° C., overlap shear strength was 77.3 kg/cm$^2$ using glass fiber-reinforced plastic, and with heating for 3 hours at 41° C., overlap shear strength was 70.3 to 84.4 kg/cm$^2$ using glass fiber-reinforced plastic.

EXAMPLES 19–28 AND COMPARATIVE EXAMPLES 6–26

Using the method of Example 1, a series of one-part moisture-curable compositions were prepared and evaluated. The compositions contained prepolymers derived from varying amounts of primary and secondary polyols together with MDI, TDI, or mixtures of MDI and TDI. The compositions were prepared using catalyst mixtures containing varying amounts of bis ether and dibutyltin dilaurate. Set out below in Table 4 are the prepolymer compositions (in equivalents, except for the toluene content, which is expressed in weight percent), the amounts of prepolymer and catalyst mixture in each composition (in grams), the tack-free time, and the 0.74 mm thick spread cure time for each example and comparative example.

TABLE 4

| | Example | | | | | | | | | |
|---|---|---|---|---|---|---|---|---|---|---|
| | 19 | 20 | 21 | 22 | 23 | 24 | 25 | 26 | 27 | 28 |
| Prepolymer composition, equivalents | | | | | | | | | | |
| Primary polyol F | 1.0 | 1.0 | 1.0 | 0.5 | 0.5 | 0.5 | 0.5 | 0.5 | 1.0 | 0.5 |
| Secondary polyol A | | | | 0.5 | 0.5 | 0.5 | 0.5 | 0.5 | | 0.5 |
| Secondary polyol B | ← | ← | ← | ← | 0.2 | → | → | → | → | → |
| MDI | ← | ← | ← | 2.52 | → | → | → | → | 1.26 | 1.26 |
| TDI | | | | | | | | | 1.26 | 1.26 |
| Toluene, wt. % | ← | ← | ← | ← | 10 w/o | → | → | → | → | → |
| Amount of prepolymer and catalyst mixture, grams | | | | | | | | | | |
| Above prepolymer | ← | ← | ← | ← | 400 | → | → | → | → | → |
| Catalyst mixture A[1] | 82 | | | 82 | | | | | | |
| Catalyst mixture B[2] | | 82 | | | 82 | | | | 82 | 82 | 82 |
| Catalyst mixture C[3] | | | 82 | | | 82 | | | | |
| Catalyst mixture D[4] | | | | | | | 82 | | | |
| Catalyst mixture E[5] | | | | | | | | | | |
| Tack-free time, min. | 2 | 1.5 | 1 | 5 | 3 | 2 | 4 | 3 | 15 | 40 |
| 0.74 Mm thick spread cure time, min. | 60 | 60 | 60 | 60 | 60 | 60 | 60 | 60 | 120 | 180 |

| | Comparative Example | | | | | | | | | |
|---|---|---|---|---|---|---|---|---|---|---|
| | 6 | 7 | 8 | 9 | 10 | 11 | 12 | 13 | 14 | 15 | 16 |
| Prepolymer composition, equivalents | | | | | | | | | | |
| Primary Polyol F | 1.0 | 1.0 | 1.0 | 0.5 | 0.5 | 0.5 | | | | | |
| Secondary polyol A | | | | 0.5 | 0.5 | 0.5 | ← | ← | 1.0 | → | → |
| Secondary polyol B | ← | ← | ← | ← | ← | 0.2 | → | → | → | → | → |
| MDI | | | | | | | | | | 2.52 | 2.52 |
| TDI | ← | ← | ← | ← | 2.52 | → | → | → | → | | |
| Toluene, wt. % | ← | ← | ← | ← | ← | 10 w/o | → | → | → | | |
| Amount of prepolymer and catalyst mixture, grams | | | | | | | | | | |
| Above prepolymer | ← | ← | ← | ← | ← | 400 | → | → | → | → | |
| Catalyst mixture A[1] | 82 | | | 82 | | | 82 | | | 82 | |
| Catalyst mixture B[2] | | 82 | | | 82 | | | 82 | | | 82 |
| Catalyst mixture C[3] | | | 82 | | | 82 | | | 82 | | |
| Catalyst mixture D[4] | | | | | | | | | | | |
| Catalyst mixture E[5] | | | | | | | | | | | |
| Tack-free time, min. | 50 | 35 | 20 | 70 | 45 | 25 | 105 | 70 | 50 | 10 | 8 |
| 0.74 Mm thick spread cure time, min. | 120 | 120 | 80 | 180 | 120 | 80 | >180 | 180 | 120 | 75 | 70 |

| | Comparative Example | | | | | | | | | |
|---|---|---|---|---|---|---|---|---|---|---|
| | 17 | 18 | 19 | 20 | 21 | 22 | 23 | 24 | 25 | 26 |
| Prepolymer composition, equivalents | | | | | | | | | | |
| Primary Polyol F | | 0.5 | 1.0 | | 0.5 | 1.0 | | 0.5 | 0.5 | |
| Secondary polyol A | 1.0 | 0.5 | | 1.0 | 0.5 | | 1.0 | 0.5 | 0.5 | 1.0 |
| Secondary polyol B | ← | ← | ← | ← | ← | 0.2 | → | → | → | → |
| MDI | 2.52 | 2.52 | | | | | | | | 1.26 |
| TDI | | | ← | ← | 2.52 | → | → | | | 1.26 |
| Toluene, wt. % | ← | ← | ← | ← | ← | 10 w/o | → | → | → | → |
| Sealant composition, grams | | | | | | | | | | |
| Above prepolymer | ← | ← | ← | ← | ← | 400 | → | → | → | → |
| Catalyst mixture A[1] | | | | | | | | | | |
| Catalyst mixture B[2] | | | | | | | | | 82 | 82 |
| Catalyst mixture C[3] | 82 | | | | | | | | | |
| Catalyst mixture D[4] | | | | | | | 82 | 82 | 82 | |
| Catalyst mixture E[5] | | 82 | 82 | 82 | 82 | 82 | | | | |
| Tack-free time, min. | 5 | 24 | 300 | 540 | 420 | 22 | 60 | 42 | 45 | 75 |
| 0.74 Mm thick spread cure time, min. | 60 | | | | | | | | | |

[1] Blend of 500 g "HB-40" plasticizer, 100 g toluene, 5 g "Niax A-99" bis ether, and 1.25 g dibutyltin dilaurate.
[2] Like catalyst mixture A but using 10 g "Niax A-99" bis ether.
[3] Like catalyst mixture A but using 20 g "Niax A-99" bis ether.
[4] Like catalyst mixture A but using 6.25 g "Niax A-99" bis ether, and no dibutyltine dilaurate.
[5] Like catalyst mixture A but using no "Niax A-99" bis ether, and 6.25 g dibutyltin dilaurate.

These examples and comparative examples show the effect of changes in the amount of bis ether upon the cure rate of unfilled compositions of this invention (compare, for example, Examples 19, 20 and 21, and Examples 22, 23, and 24). Also, use of MDI to form the prepolymer provides unfilled compositions having faster cure rate than corresponding unfilled compositions prepared using a prepolymer derived from TDI (compare, for example, Examples 19-24 with Comparative Examples 6-11).

EXAMPLE 29

A silane-containing primer was prepared as in Examples 14-18, and labeled "PM 1". Separately, 955 g polyester resin ("Vitel PE 200", commercially available from Goodyear Tire & Rubber Co.), 958 g toluene, 958 g ethyl acetate, 3210 g methyl ethyl ketone, and 1330 g carbon black ("Raven 410", commercially available from Cities Service Co.) were combined by stirring under nitrogen, and labeled "PM 2". Separately, 10 g dibutyltin dichloride was combined with 90 g toluene, and labeled "PM 3".

The following ingredients were mixed in the amounts shown below:

| Ingredient | Amount, g |
| --- | --- |
| PM 1 | 2038 |
| PM 2 | 7410 |
| PM 3 | 65 |
| Isocyanate mixture[1] | 2005 |
| Molecular sieves[2] | 3 |
| Methyl ethyl ketone | 1644 |

[1]"Mondur HC" (a mixture of TDI and hexamethylene diisocyanate, commercially available from Mobay Chemical Co.
[2]"Linde type 3A" (commercially available from Union Carbide Corp.).

A broken windshield in a 1971 Pontiac Ventura was replaced as follows. The chrome windshield trim and antenna were removed, and the exposed portion of the original sealant was cut away from the windshield and from the corresponding mating surfaces of the windshield frame. The broken windshield was removed. A rusted area on a pinch-weld seam was covered with butyl tape. The replacement windshield was cleaned with a glass cleaner. A 25-37 mm wide bead of the above-described silane-containing primer composition was applied to the perimeter of the inside surface of the replacement windshield using a cotton applicator, and the primer was allowed to dry. It was observed that use of a 13 mm wide bead of the silane-containing primer composition (in place of the 25-37 mm wide bead actually used) would have provided a sufficiently large primed area in the bonding procedure which follows. A 9 mm wide bead of the one-part moisture-curable sealant of Example 17 was applied to remaining old sealant on the windshield frame. The replacement windshield was pressed into the windshield frame using moderate pressure, and the gap between the edge of the replacement windshield and the windshield frame was backfilled with additional sealant. It was observed that a use of a 13 mm wide (or wider) bead of sealant (in place of the 9 mm wide bead actually used) would have provided a greater bond area and would have required less backfilling. The backfilled area was allowed to become tack-free. The chrome trim and antenna were reattached.

The resulting bonded windshield assembly did not leak when the car was washed and did not leak in a rainstorm during which 21 mm of rainfall was recorded.

In a separate evaluation, two approximately 9 mm wide × 110-115 mm long beads of the above-described sealant were applied side by side to one face of a 76 mm wide × 149 mm long × 6 mm thick piece of automotive safety glass. The surface of the glass under one of the beads had been previously dauber-coated with a thin layer of the above-described silane-containing primer. The resulting assembly was exposed (at an inclination of 45° from the vertical) through the glass side to south sunlight near Miami, Fla. After six months, the assembly had been exposed to 616 hours of sunlight, 71,048 total Langleys, and 41,076 U.V. Langleys. The samples were taken indoors and the adhesion of each bead to the glass was evaluated. The bead which had been applied to an unprimed surface could be peeled away from the glass using finger pressure. The bead which had been applied to a primed surface could not be peeled away from the glass using finger pressure.

In a separate evaluation, the above-described silane-containing primer and sealant were sequentially applied to a piece of automotive safety glass and exposed through the glass side in an "Atlas Weatherometer" accelerated weathering testing machine. The sample survived an exposure of 1000 hours without bond failure. After an exposure of 2000 hours, a manual 180° peel test resulted in cohesive failure in the sealant layer.

EXAMPLE 30

The one-part moisture-curable sealant of Example 17 was compared to a commercially available one-part moisture-curable windshield sealant ("Urethane E", commercially available from Essex Chemical Corp.). The commercially available windshield sealant is believed to be prepared generally in accordance with Example 1 of U.S. Pat. No. 3,707,521 (hereafter, "DeSantis"), except that "HB-40" plasticizer is used in place of "Arochlor" plasticizer (the latter plasticizer is no longer commercially available from Monsanto Chemical Co., the manufacturer).

The sealant of the present invention became tack-free in 7 minutes, whereas the commercial windshield sealant did not become track-free until 90 minutes had elasped. A 6 mm thick sample of the sealant of this invention cured completely in 24 to 26 hours, whereas a 6 mm thick sample of the commercially available windshield sealant required 28 to 32 hours to cure completely.

The rate of strength buildup of each sealant was evaluated using the "Flatwise Tensile Test". This test was performed by coating two 76.2 mm × 152.4 mm glass panels with a primer composition along a 25.4 mm wide center stripe down the long dimension of the panel. The silane-containing primer composition of Example 29 was used for the sealant of the present invention, and "Black Glass Primer #2" (commercially available from Essex Chemical Corp.) was used for the commercially available windshield sealant. A 6.4 mm wide × 7.9 mm thick × 101.6 mm long bead of sealant was laid centrally along the long axis of the primer stripe on one panel, two 6.4 mm spacers were placed on the panel at each end of the bead, the second panel was placed on top of the spacers, and the resulting assembly was inverted and allowed to cure at 24° C. and 50% R.H. The tensile strength of the cured assembly was evaluated using a "Thwing-Albert Intelect-2000" tensile tester operated at a crosshead speed of 508 mm/minute. The following results were obtained using laminated safety glass panels. Unless otherwise indicated, the mode of failure was cohesive, i.e., within the bond. Where indicated with an asterisk, the mode of failure was within the glass. Laminated safety glass typically suffers failure by delamination at about 21 to 31.6 kg/cm$^2$.

| Bond age, hr. | Cure strength buildup, Flatwise Tensile Test, Kg/cm², on laminated safety glass | |
|---|---|---|
| | Sealant of Example 17 | Commercially available windshield sealant |
| 1.5 | 2.7 | <0.7 |
| 3.0 | 7.6 | <2.4 |
| 5.5 | 11.02 | 9.1 |
| 24 | 18.3 | 13.7 |
| 48 | 27.2* | 19.8 |
| 168 | 24.5* | 32.8* |

*glass failure

To eliminate the effect of delamination of the safety glass samples, the above compositions were also evaluated using 6.4 mm thick solid plate glass. The following results were obtained, with all bond failures being cohesive.

| Bond age, hr. | Cure strength buildup, Flatwise Tensile Test, Kg/cm², on 6.4 mm solid plate glass | |
|---|---|---|
| | Sealant of Example 17 | Commercially available windshield sealant |
| 3 | 4.4 | 1.5 |
| 5.5 | 6.1 | 4.1 |
| 24 | 30.7 | 22.9 |
| 168 | 53.4 | 40.1 |

This example shows that a composition of this invention offered faster tack-free time, faster cure strength buildup, and higher strength than a commercially available windshield sealant.

EXAMPLES 31–34 AND COMPARATIVE EXAMPLES 27–30

Using the method of Example 1 of DeSantis, a series of eight one-part moisture-cureable sealants was prepared. In Comparative Example 27, Example 1 of DeSantis was repeated, except that (a) the polypropylene ether diol "Pluracol P 2010" (commercially available from BASF/Wyandotte Corp.) was used in place of the polypropylene ether diol "Pluracol P 2020" said to be used by DeSantis, as the latter diol is not available from BASF/Wyandotte Corp., and (b) the plasticizer "HP-40" was used in place of the plasticizer "Acochlor 1242", as the latter plasticizer is no longer available from the manufacturer. In Comparative Example 28, Comparative Example 27 was repeated but the blocking agent diethyl malonate was excluded. In Comparative Example 29, Comparative Example 27 was repeated, but the polyols "Pluracol 2010" and "TPE 4542" were replaced by corresponding hydroxyl equivalent weights (0.83 OH equivalents and 0.25 OH equivalents, respectively) of the polyols "Teracol 2000" and "LHT 42". In Comparative Example 30, Comparative Example 29 was repeated, but the blocking agent diethyl malonate was excluded. In Example 31, Comparative Example 29 was repeated, but the NCO:OH ratio was reduced by decreasing the amount of MDI, 0.17 OH equivalents of "LHT 28" polyol were used in place of 0.25 OH equivalents of "LHT 42" polyol, and "Niax A99" bis-ether was added to the sealant. In Example 32, Example 31 was repeated but the blocking agent diethyl malonate was excluded. In Examples 33 and 34, Examples 31 and 32, respectively, were repeated but the NCO:OH ratio was increased to 2:1 by employing more MDI.

The tack-free time and rate of strength buildup of the resulting sealants was evaluated using the method of Example 30. Set out below in Table 5 are the composition, tack-free time, Flatwise Tensile Test strength at 6 hours, and mode of bond failure during the Flatwise Tensile Test for the sealants of Examples 31–34 and Comparative Examples 27–30. The sealants of Comparative Examples 29 and 30 cured within 24 hours after formulation, and were not tested for tack-free time or rate of strength buildup.

TABLE 5

| | Example | | | | Comparative Example | | | |
|---|---|---|---|---|---|---|---|---|
| | 31 | 32 | 33 | 34 | 27 | 28 | 29 | 30 |
| Prepolymer composition, grams | | | | | | | | |
| Primary polyol A | ← | ← | 854 | → | → | | | 854 | 854 |
| Primary polyol G[1] | | | | | 377 | 377 | | |
| Secondary polyol B | ← | ← | 340 | → | → | | | |
| Secondary polyol C[2] | | | | | 823 | 823 | | |
| Secondary polyol D[3] | | | | | | | 343 | 343 |
| MDI | 198 | 198 | 263 | 263 | ← | ← | 214 | → |
| Plasticizer[4] | ← | ← | 570 | → | → | ← | ← | 570 | → | → |
| Stannous octoate | | | | | ← | ← | 0.12 | → | → |
| Diethyl malonate | 5 | | 6.1 | | 5 | | 5 | |
| Sealant composition, grams | | | | | | | | |
| Above prepolymer | ← | ← | 648 | → | → | ← | ← | 648 | → | → |
| Carbon black[5] | ← | ← | 186 | → | → | ← | ← | 186 | → | → |
| Carbon black[6] | ← | ← | 132 | → | → | ← | ← | 132 | → | → |
| Dibutyltin dilaurate | ← | ← | 0.22 | → | → | ← | ← | 2.3 | → | → |
| bisether | ← | ← | 1.7 | → | → | | | | |
| Toluene | ← | ← | 28 | → | → | ← | ← | 28 | → | → |
| Diethyl malonate | 2.75 | | 2.75 | | 2.75 | | 2.75 | |
| Sealant tack-free time, min. | <5 | <5 | 5 | 5 | 75 | 75 | —[8] | —[8] |
| Failure Tensile Test strength at 6 hrs., kg/cm² | 25.0 | 27.3 | 19.5 | 23.0 | 5.3 | 5.3 | —[8] | —[8] |
| Failure mode | glass | glass | cohesive | cohesive | cohesive | cohesive | —[8] | —[8] |

[1]"Pluracol TPE-4542" (a 4500 M.W. triol containing primary hydroxyl groups, commercially available from BASF/Wyandotte Corp.).
[2]"Pluracol P-2010" (a 2000 M.W. diol containing secondary hydroxyl groups, commercially available from BASF/Wyandotte Corp.).
[3]"LHT 42" (a 4000 M.W. triol containing secondary hydroxol groups, commercially available from Union Carbide Corp.).
[4]"HB-40".
[5]"Vulcan C" (a conductive oil furnace black, commercially available from Cabot Corp).
[6]"Sterling MT" (a thermal black, commercially available from Cabot Corp.).
[7]"Niax A-99".
[8]Not tested - sealant cured within 24 hours of formulation.

These examples show a comparison between blocked and unblocked sealants, and illustrate the rapid tack-free time and rate of strength buildup of the compositions of the invention.

Various modifications and alterations of this invention will be apparent to those skilled in the art without departing from the scope and spirit of this invention and the latter should not be restricted to that set forth herein for illustrative purposes.

I claim:

1. Compositions, comprising:
   (a) isocyanate-functional prepolymer(s) derived from 4,4'-diphenylmethane diisocyanate (or isocyanate functional derivatives of 4,4'-diphenylmethane diisocyanate) and polyol(s) containing hydroxyl groups about 25 to 100 weight percent of which are primary hydroxyl groups, and
   (b) bis[2-(N,N-dialkylamino)alkyl]ether(s), in an amount effective to provide moisture curability of said prepolymer(s).

2. Compositions according to claim 1, wherein said polyol(s) have a hydroxyl equivalent weight from about 45 to about 2500, and a pH from about 5.5 to about 7.

3. Compositions according to claim 1, wherein said polyol(s) comprise polytetramethylene oxide glycols, ethylene oxide-terminated polypropylene glycols, or polycaprolactone polyols.

4. Compositions according to claim 1, wherein said prepolymer(s) are derived from two or more polyols, with about 25 to 100 weight percent of said polyols having primary hydroxyl groups, and about 75 to 0 weight percent of said polyols having secondary hydroxyl groups.

5. Compositions according to claim 4, wherein about 40 to about 80 weight percent of said polyols have primary hydroxyl groups, and about 60 to about 20 weight percent of said polyols have secondary hydroxyl groups.

6. Compositions according to claim 1, wherein said prepolymer(s) are the reaction product of isocyanate and hydroxyl-containing polyols combined at an NCO:OH equivalent ratio from about 1.2:1 to about 3.5:1.

7. Compositions according to claim 6, wherein said ratio is from about 1.8:1 to about 2.2:1.

8. Compositions according to claim 1, wherein said bis[2-(N,N-dialkylamino)alkyl]ether(s) comprise bis[2-(N,N-dimethylamino)ethyl]ether.

9. Adhesive, coating, or sealant compositions, comprising a composition according to claim 1, together with filler, solvent, and plasticizer.

10. Adhesive, coating, or sealant compositions, comprising a composition according to claim 3, together with filler, solvent, and plasticizer.

11. Adhesive, coating, or sealant compositions, comprising a composition according to claim 5, together with filler, solvent, and plasticizer.

12. Cured assemblies, comprising an article and a substrate, with a layer comprising a composition according to claim 1 therebetween.

13. A method for bonding articles to substrates, comprising the step of applying therebetween a layer comprising a composition according to claim 1.

14. Compositions, comprising
   (a) isocyanate-functional prepolymer(s) derived from 4,4'-diphenylmethane diisocyanate and two or more polyols, wherein about 40 to 80 weight percent of said polyols comprise polytetramethylene oxide glycols having a molecular weight of about 650 to about 2000, and about 60 to about 20 weight percent of said polyols comprise propylene oxide-terminated ethylene oxide glycols or polypropylene glycols, and
   (b) about 0.05 to about 0.5 weight percent, based upon the weight of said prepolymer, of bis[2-(N,N-dimethylamino)ethyl]ether.

15. Adhesive, coating, or sealant compositions, comprising a composition according to claim 9, together with filler, solvent, and plasticizer.

16. Bonded windshield or backlight assemblies, comprising a windshield or backlight of laminated safety glass, a vehicle, a layer comprising silane-containing primer on the inside perimeter of said glass, and a layer comprising a composition according to claim 9 between said primer layer and said vehicle.

17. A method for bonding articles to substrates, comprising the step of applying therebetween a layer comprising a composition according to claim 9.

18. Compositions, comprising compounds of the formula

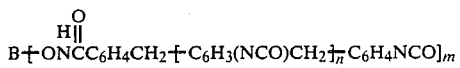

where m is 2 or more, n is greater than or equal to zero, and B is a radical of a polyvalent polyol containing hydroxyl groups about 25 to 100 weight percent of which are primary hydroxyl groups and having a backbone selected from divalent aliphatic, olefinic, ether, ester, thioether, urethane, or urea radicals, together with bis[2-(N,N-dialkylamino)alkyl]ether(s) in an amount effective to provide moisture curability of said compounds.

19. Compositions according to claim 18, comprising compounds of the formula

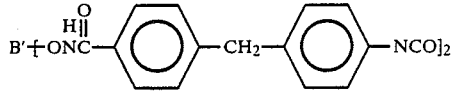

where B is a divalent polyether radical, together with bis[2-(N,N-dimethylamino)ethyl]ether.

20. Adhesive, coating, or sealant compositions, comprising a composition according to claim 11, together with filler, solvent, and plasticizer.

* * * * *

UNITED STATES PATENT AND TRADEMARK OFFICE
CERTIFICATE OF CORRECTION

PATENT NO. : 4,511,626
DATED : April 16, 1985
INVENTOR(S) : Gerald F. Schumacher It is certified that error appears in the above-identified patent and that said Letters Patent is hereby corrected as shown below:

Col. 2, line 36, "composition of formulations." should read -- compositions or formulations. --.

Col. 6, line 11, "aailable" should read -- available --.

Col. 7, line 30, "(N,N-dimethylamino)-1-methylethylether." should read -- (N,N-dimethylamino)-1-methylethyl ether --.

Col. 10, line 8, "moisture-capable" should read -- moisture-curable --.

Col. 16, line 37, "track-free" should read -- tack-free --.

Col. 17, line 65, "moisture-cureable" should read -- moisture-curable --.

UNITED STATES PATENT AND TRADEMARK OFFICE
CERTIFICATE OF CORRECTION

PATENT NO. : 4,511,626

DATED : April 16, 1985

INVENTOR(S) : Gerald F. Schumacher

Page 2 of 2

It is certified that error appears in the above-identified patent and that said Letters Patent is hereby corrected as shown below:

Col. 20, line 18, "claim 9" should read -- claim 14 --.

Col. 20, line 24, "claim 9 " should read -- claim 14 --.

Col. 20, line 28, "claim 9" should read -- claim 14 --.

Col. 20, line 56, "claim 11" should read - claim 19 --.

Signed and Sealed this

Fourth Day of March 1986

[SEAL]

Attest:

DONALD J. QUIGG

Attesting Officer

Commissioner of Patents and Trademarks